(12) United States Patent
Chun

(10) Patent No.: US 7,900,234 B2
(45) Date of Patent: Mar. 1, 2011

(54) BROADCASTING RECEIVER AND COMMUNICATION METHOD USING THE BROADCASTING RECEIVER

(75) Inventor: Won Ho Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 596 days.

(21) Appl. No.: 12/000,326

(22) Filed: Dec. 11, 2007

(65) Prior Publication Data

US 2008/0155640 A1    Jun. 26, 2008

(30) Foreign Application Priority Data

Dec. 20, 2006   (KR) ..................... 10-2006-0130997

(51) Int. Cl.
H04N 7/173      (2006.01)
(52) U.S. Cl. ................. 725/121; 725/110; 725/111; 725/124
(58) Field of Classification Search ............. None
See application file for complete search history.

(56) References Cited

U.S. PATENT DOCUMENTS

| | | | |
|---|---|---|---|
| 5,768,539 A * | 6/1998 | Metz et al. ................... | 709/249 |
| 6,230,326 B1 * | 5/2001 | Unger et al. ................. | 725/111 |
| 7,150,017 B1 * | 12/2006 | Vogl et al. .................... | 718/102 |
| 7,594,252 B2 * | 9/2009 | Johnson et al. ............. | 725/107 |
| 7,810,127 B2 * | 10/2010 | Stanek et al. ................ | 725/129 |
| 2003/0048380 A1 * | 3/2003 | Tamura ....................... | 348/552 |
| 2004/0172652 A1 * | 9/2004 | Fisk et al. ...................... | 725/78 |
| 2004/0259605 A1 * | 12/2004 | Quigley et al. .............. | 455/574 |
| 2006/0059391 A1 * | 3/2006 | Park ............................ | 714/48 |
| 2006/0085833 A1 * | 4/2006 | Kwon .......................... | 725/111 |
| 2006/0130120 A1 * | 6/2006 | Brandyberry et al. ....... | 725/136 |
| 2006/0159122 A1 * | 7/2006 | Rao ............................ | 370/466 |
| 2007/0180532 A1 * | 8/2007 | Cha et al. .................... | 726/25 |

(Continued)

FOREIGN PATENT DOCUMENTS

CN        1383290         12/2002

(Continued)

OTHER PUBLICATIONS

"DOCSIS Set-top Gateway Specification." CM-SP-DSG-I16-101008.*

(Continued)

*Primary Examiner*—Brian T Pendleton
*Assistant Examiner*—Ryan Stronczer
(74) *Attorney, Agent, or Firm*—McKenna Long & Aldridge LLP

(57) ABSTRACT

A method of performing communication between an Internet protocol (IP) address allocation server and an apparatus including a cable card and a host device is disclosed. In the communication method, the host acquires identification information of the cable card and transmits a message including the identification information of the cable card to the IP address allocation server. The host receives an IP address for the cable card from the IP address allocation server and sends the received IP address for the cable card to the cable card. Accordingly, it is possible to acquire the IP addresses for the host and the cable card via one physical interface. In addition, it is possible to stabilize an overall system by efficiently operating the IP process according to an operation mode of the cable card.

19 Claims, 7 Drawing Sheets

U.S. PATENT DOCUMENTS

| | | | |
|---|---|---|---|
| 2009/0046996 A1* | 2/2009 | Harada | 386/124 |
| 2009/0210916 A1* | 8/2009 | Lajoie et al. | 725/98 |
| 2010/0017816 A1* | 1/2010 | Martini et al. | 725/31 |
| 2010/0071020 A1* | 3/2010 | Addington et al. | 725/132 |

FOREIGN PATENT DOCUMENTS

| | | |
|---|---|---|
| CN | 1430382 | 7/2003 |
| WO | WO 03/094366 | 11/2003 |

OTHER PUBLICATIONS

"Dynamic Host Configuration Protocol (DHCP) Option for CableLabs Client Configuration," Beser & Duffy, Standards Track, Mar. 2003, 13 pages.

"CableCard Interface 2.0 Specification," OC-SP-CCIF2.0-I07-060803, 289 pages.

* cited by examiner

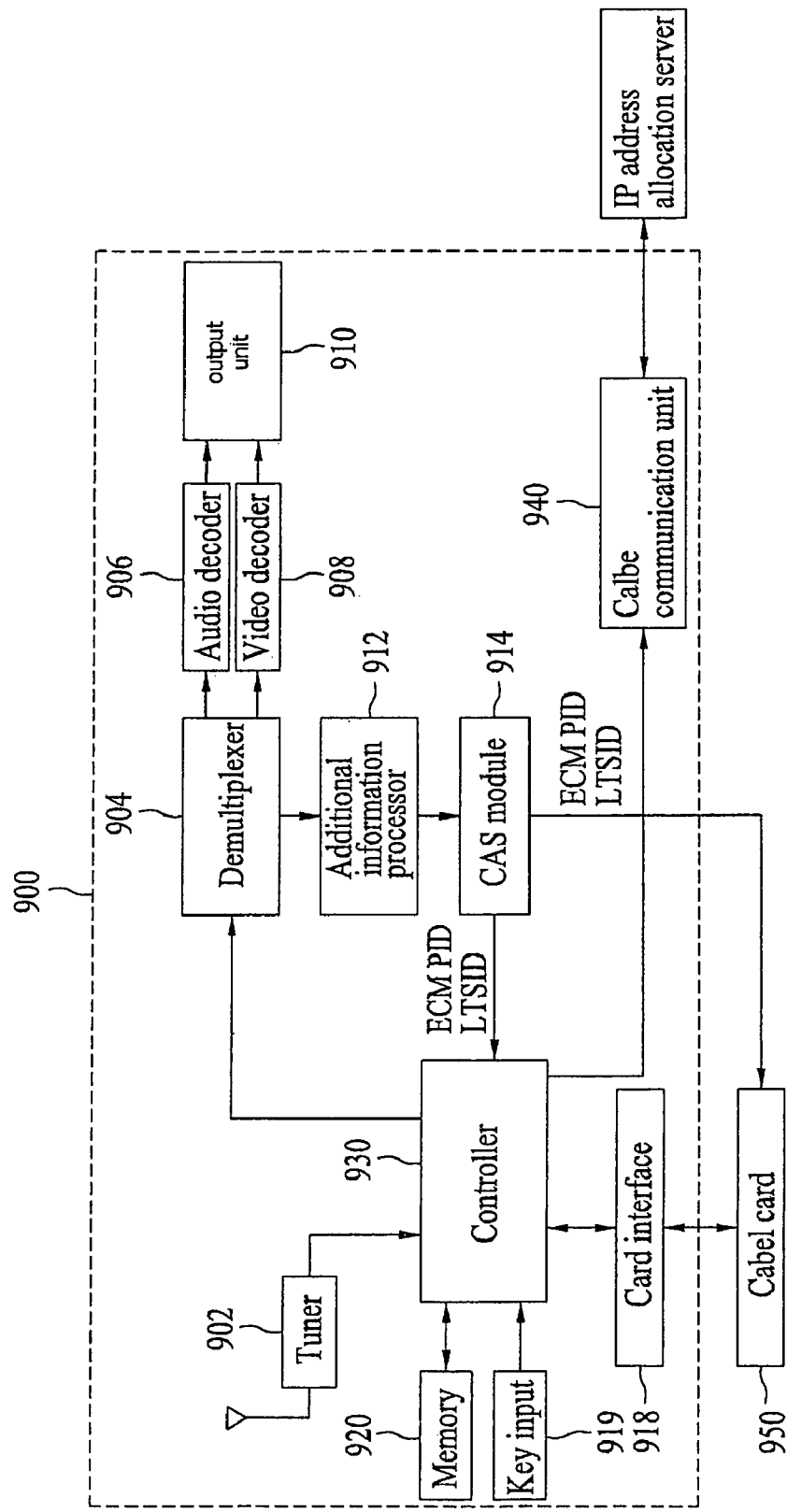

BROADCASTING RECEIVER AND COMMUNICATION METHOD USING THE BROADCASTING RECEIVER

This application claims the benefit of Korean Patent Application No. 10-2006-0130997, filed on Dec. 20, 2006, which is hereby incorporated by reference as if fully set forth herein.

BACKGROUND OF THE INVENTION

1. Field of the Invention

The present invention relates to a broadcasting receiver and a communication method using the broadcasting receiver.

2. Discussion of the Related Art

In an existing one-way cable television (TV) system, since necessary data is received through a down channel, an Internet protocol (IP) address is not required. In contrast, in a two-way cable TV system, since network communication using a down channel and an up channel is possible, an IP address for IP communication needs to be acquired. The cable TV system can perform communication according to RFC 2131 and RFC 2132 using a dynamic host configuration protocol (DHCP), for two-way IP communication.

In general, an IP address is allocated to a physical interface in one-to-one correspondence. For example, one IP address is allocated to one network card. If the number of network cards is two, two IP addresses may be allocated to the respective physical layers thereof. For example, on a Linux system, the IP addresses may be represented by interfaces eth0 and eth1, and the interfaces enable IP communication through the respective physical interfaces.

Currently, in order to implement the two-way cable TV system, total three IP addresses are required. Among them, a first IP address is used by a cable modem (eCM), another IP address is used by a host, and the other IP address is used by a cable card.

The cable modem can directly acquire the IP address from an IP address allocation server, and the host acquires an IP address for the host and an IP address for the cable card connected to the host. However, communication between an external network and a cable receiver including the cable modem, the host and the cable card are performed via the cable modem.

Since the cable card does not include a separate network interface, the host should acquire the IP address for the host and the IP address for the cable card. When the host performs IP networking, for example, a Linux network stack is used. Accordingly, it is easy to acquire the IP address for the host. However, the cable card only performs communication based on a host-cable card interface (CCIP) standard and does not include an interface which can perform IP network communication. Accordingly, it is impossible for the cable card to independently receive the IP address and perform the IP network communication.

SUMMARY OF THE INVENTION

Accordingly, the present invention is directed to a broadcasting receiver and a communication method using the broadcasting receiver that substantially obviate one or more problems due to limitations and disadvantages of the related art.

An object of the present invention is to provide a broadcasting receiver including an IP process for receiving an IP address of a cable card and a method of controlling the IP process.

Another object of the present invention is to provide a broadcasting receiver capable of efficiently operating an IP process according to a mode of a cable card and a method of controlling the IP process.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of performing communication between an Internet protocol (IP) address allocation server and a cable card for a host device is included. In the communication method, the host acquires identification information of the cable card and transmits a message including the identification information of the cable card to the IP address allocation server. The host receives an IP address for the cable card from the IP address allocation server and sends the received IP address for the cable card to the cable card.

In another aspect of the present invention, a broadcasting receiver communicating with an IP address allocation server is included. The broadcasting receiver includes a cable card and a controller. The cable card makes a request for an IP address of the cable card. The controller receives the request from the cable card, transmits a message including identification information of the cable card to the IP address allocation server, receives the IP address of the cable card from the IP address allocation server, and transmits the received IP address to the cable card.

It is possible to acquire the IP addresses for the host and the cable card via one physical interface. In addition, it is possible to stabilize an overall system by efficiently operating the IP process according to an operation mode of the cable card.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 is a view showing the configuration of the broadcasting receiver.

DETAILED DESCRIPTION OF THE INVENTION

Reference will now be made in detail to the preferred embodiments of the present invention, examples of which are illustrated in the accompanying draings. Wherever possible, the same reference numbers will be used throughout the drawings to refer to the same or like parts.

Figure 1:
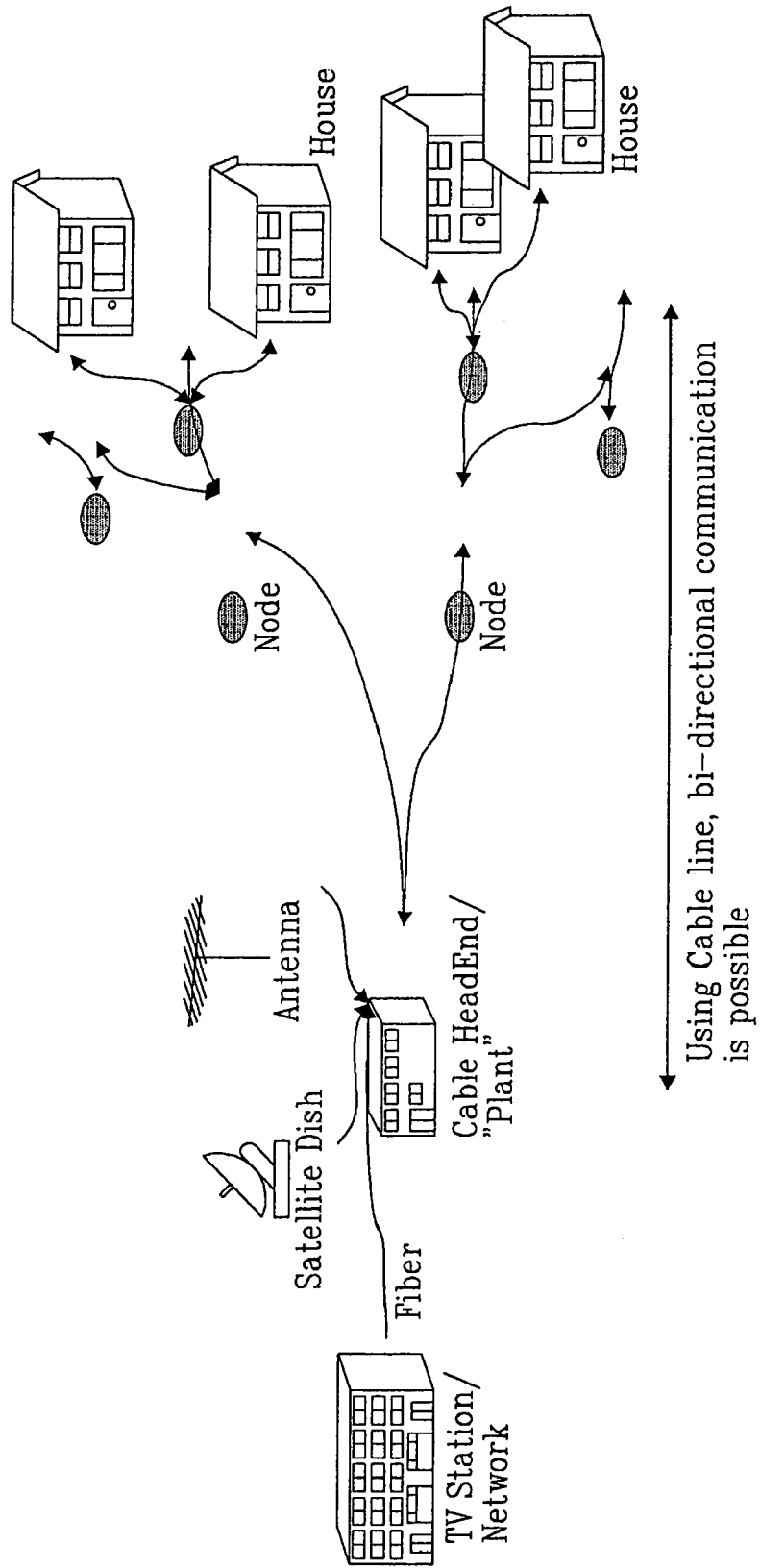
FIG. 1 is a conceptual diagram of a broadcasting network in digital cable broadcasting.

FIG. 1 is a conceptual diagram of a broadcasting network in digital cable broadcasting. Referring to FIG. 1, a cable headend (hereinafter, referred to as a headend) or a plant can receive a broadcasting signal via various communication networks.

The headend can transmit the cable broadcasting signal, which is received via the various communication networks, to a cable broadcasting receiver via a network including a node. The cable broadcasting receiver can receive the broadcasting signal from the headend or transmit a specific signal to the headend. At this time, the transmission/reception is realized via a cable network shown in FIG. 1, which can bi-directionally transmit data.

A host can be connected to peripheral devices such as a digital television receiver, a DVD player, a digital camcorder, and a set top box via various types of interfaces.

The host can receive and process a cable broadcasting service from the headend, as described above.

That is, the host downloads a monitor application, various applications, or an opencable application platform (OCAP)-Java application such as an electronic program guide (EPG) from the remote headend via the cable network and operates the application on its system.

At this time, a security module is installed in the receiver which receives the broadcasting signal. Accordingly, the broadcasting receiver is composed of the host and the security module. The host and the security module exchange an encrypted broadcasting signal or other data, for security.

At this time, the headend and the host use IP network communication, for two-way communication. In this case, the host receives an IP address in order to transmit data via an up channel.

Figure 2:
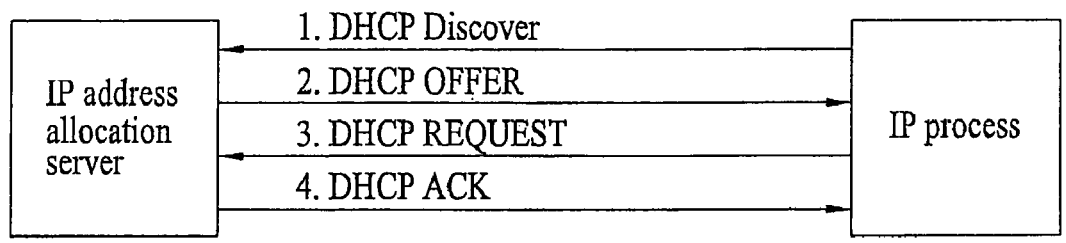
FIG. 2 is a view showing the flow of data between an IP process of a host and an IP address allocation server.

FIG. 2 is a view showing the flow of data between an IP process of the host and an IP address allocation server.

Referring to FIG. 2, the IP process and the IP address allocation server transmit/receive messages in time-series order.

The IP process indicates a process for performing the IP network communication in the host and may be, for example, a process for receiving the IP address according to a dynamic host configuration protocol (DHCP). In this case, the IP address allocation server may be called a DHCP server and the IP process may be called a DHCP client. In FIG. 2, for example, the DHCP is shown for convenience of description. The IP process may be a process for the DHCP client or a processor for performing the process.

First, the IP process transmits a DHCP discover message in order to search for a usable IP address allocation server (1).

The IP address allocation server which receives the DHCP message transmits a DHCP offer message to the IP process in response to the DHCP discover message (2).

The IP process receives the DHCP offer message and transmits a DHCP request, which is an IP address request message, to the IP address allocation server (3). The IP address allocation server which receives the DHCP request message transmits a DHCP ACK, which is a response message, to the IP process (4).

Hereinafter, the detailed request message and the main components for transmission/reception will be described.

Figure 3:
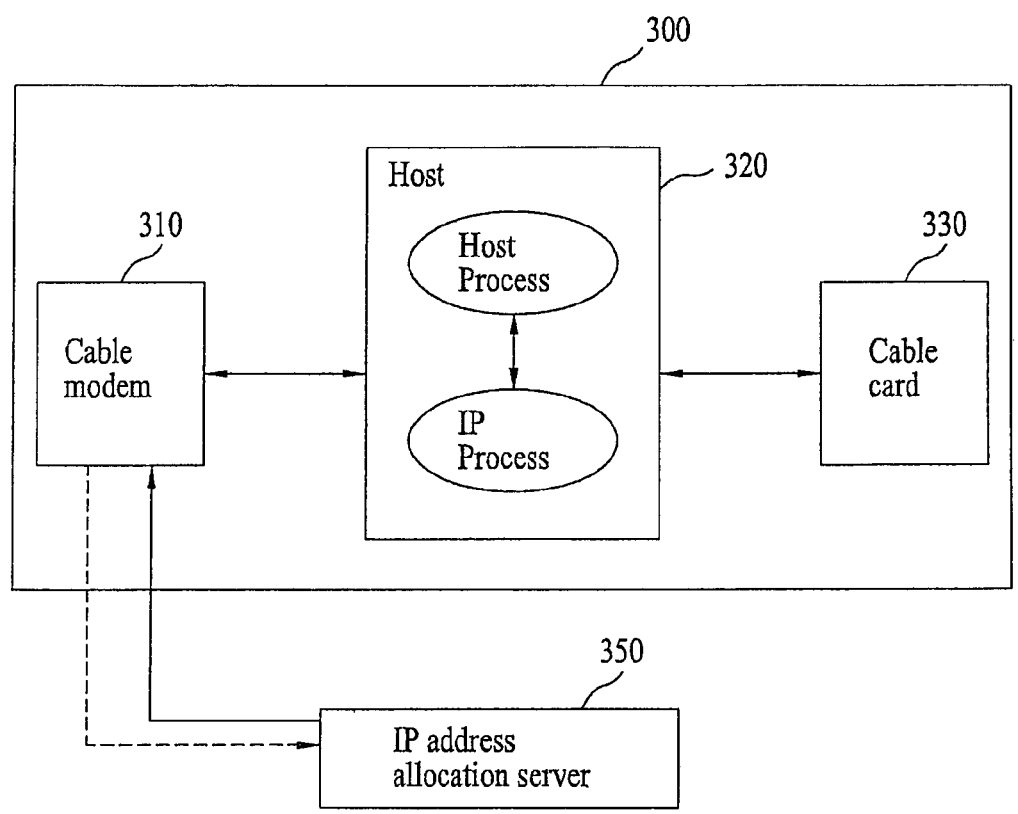
FIG. 3 is a view showing a system in which a broadcasting receiver is connected to the IP address allocation server.

FIG. 3 is a view showing a system in which the broadcasting receiver is connected to the IP address allocation server. Referring to FIG. 3, the cable broadcasting receiver 300 includes a cable modem 310, a host 320 and a cable card 330. The IP address allocation server 350 is connected to the cable modem 310 and performs network communication with the cable broadcasting receiver 300 via a down channel and an up channel. At this time, the cable modem is an example of a cable communication unit.

The host may perform a host process for controlling a variety of hardware of the host and an IP process for performing the IP network communication and may include processors for implementing the host process and the IP process. The processor for performing the host process and the processor for performing the IP process may be equal physically to each other. The IP process may be a DHCP client and the IP address allocation server may be a DHCP server.

In order to perform the IP network communication, all the cable modem 310, the host 320 and the cable card 330 require the respective IP addresses.

First, the cable modem 310 may receive the IP address from the IP address allocation server through the procedure shown in FIG. 2 and may transmit information via the up channel using the received IP address. That is, the cable modem 310 searches for the IP address allocation server 350, is connected to the IP address allocation server 350, transmits identification information of the cable modem 310 to the IP address allocation server 350, and makes a request for an IP address. Then, the IP address allocation server 350 transmits the IP address for the cable modem to the cable modem 310. Accordingly, the IP network communication between the cable modem 310 and the IP address allocation server 350 becomes possible. That is, the two-way communication between the broadcasting receiver and the IP address allocation server becomes possible.

If the two-way communication becomes possible, the cable modem 310 transmits a "2-way-OK" message indicating that the two-way communication is possible to the host 320. The host 320 operates the IP process for the host in order to obtain the IP address for the host. The host 320 operates the IP process and receives the IP address for the host from the IP address allocation server 350 via the cable modem 310 in a method similar to the method of acquiring the IP address by the cable modem 310.

Hereinafter, a method of controlling the IP process such that the host 320 receives the IP address of the cable card will be described.

Figure 4:
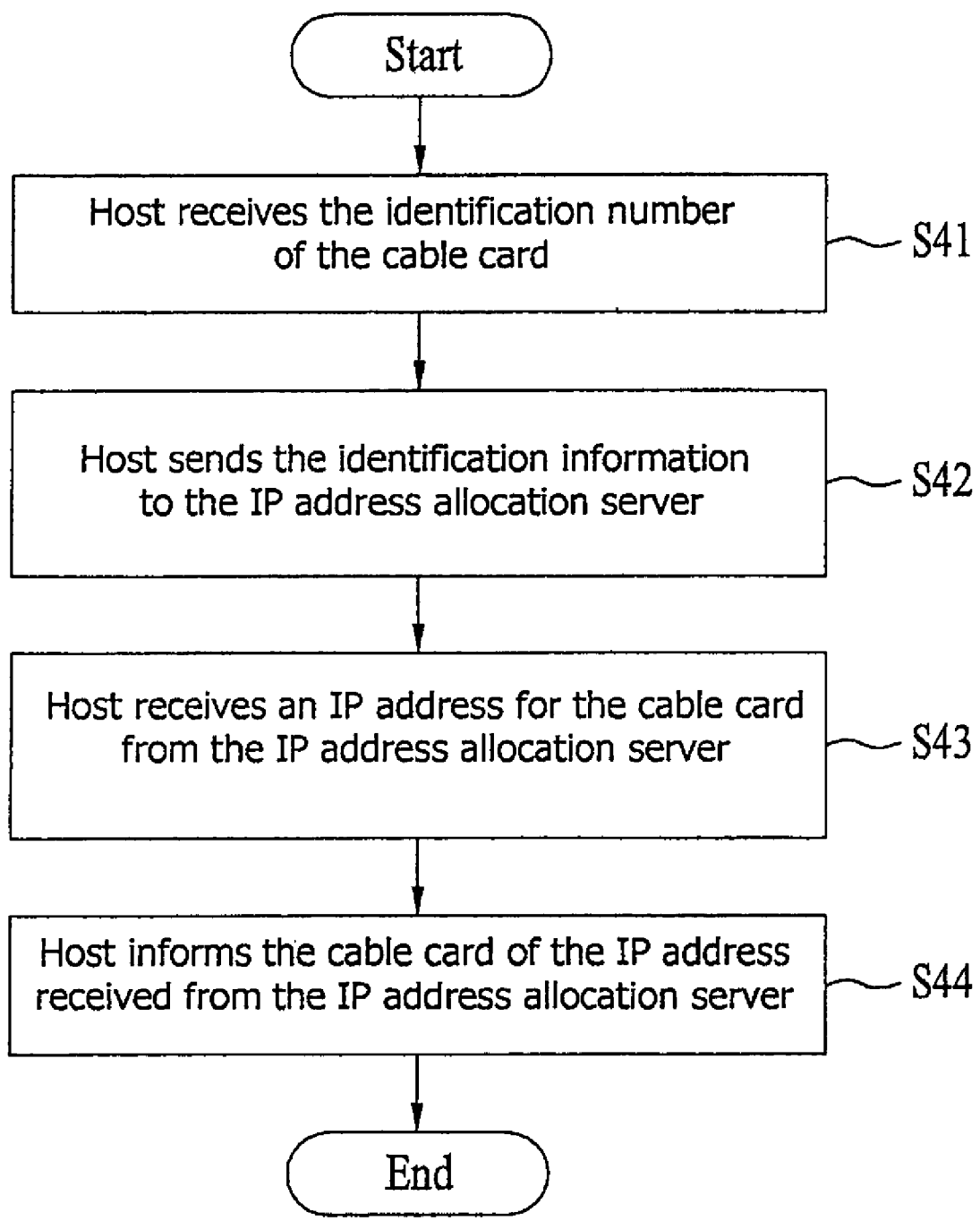
FIG. 4 is a flowchart illustrating a method of controlling the broadcasting receiver.

FIG. 4 is a flowchart illustrating a method of controlling the broadcasting receiver.

Referring to FIG. 4, the method of controlling the broadcasting receiver includes receiving identification information of the cable card (S41), transmitting the identification information to the IP address allocation server (S42), receiving an IP address for the cable card from the IP address allocation server (S43), and transmitting the received IP address to the cable card (S44).

In the step S41, the host receives the identification information of the cable card via a cable card interface (CCIF). At this time, the cable card makes a request for the IP address to the host and the cable card sends the identification information to the host.

The identification information of the cable card includes an identification number of the cable card. The host may further receive option data from the cable card.

The identification number of the cable card is an identifier for identifying the cable card and includes a media access control (MAC) or a serial number of the cable card. The option data indicates vendor information of the cable card. The vendor information is information on a manufacturer of the card.

In the step S42, the host sends the identification information received from the cable card to the IP address allocation server. That is, the IP process for the cable card of the host includes the identification information received from the cable card in a message and transmits the message to the IP address allocation server.

The IP process which receives the IP address for the host and the IP process which receives the IP address for the cable card are independently operated. When the IP address is received using the DHCP, the host operates a DHCP process for acquiring the IP address of the host and a DHCP process for acquiring the IP address of the cable card.

The IP process which receives the IP address for the cable card sends the identification information of the cable card to the IP address allocation server so as to represent that the requested IP address is the IP address for the cable card.

In the step S43, the host receives the IP address for the cable card from the IP address allocation server, that is, the IP address allocation server, which receives the request for the IP address for the cable card of the host, transmits the IP address for the cable card to the host.

The IP address includes network information for network communication and may include all the IP address, a sub net address, a gateway, a bns and a domain name.

In the step S44, the host informs the cable card of the IP address received from the IP address allocation server, that is, informs the cable card of the IP address of the cable card via the CCIF.

At this time, if the network communication is not established or the IP address is not received from the IP address allocation server, the host transmits a rejection message indicating that the IP address cannot be allocated to the cable card. At this time, the IP process of the host determines whether or not the IP address can be allocated and sends the rejection message to the host process. Then, the host process can transmit the message to the cable card.

Figure 5:
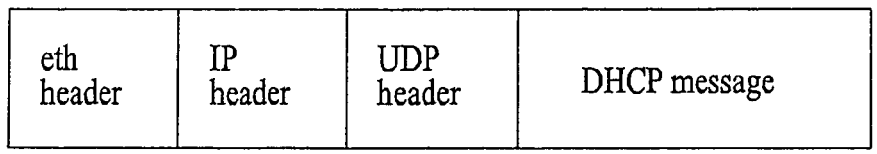
FIG. 5 is a view showing the form of a message which is exchanged between the IP process and the IP address allocation server.

FIG. 5 is a view showing the form of a message which is exchanged between the IP process and the IP address allocation server.

Referring to FIG. 5, an example of the message includes an eth header, an IP header, an UDP header and a DHCP message.

The eth header is an example of a header for identifying a physical interface (for example ethernet header). That is, in the embodiment of the present invention, an interface which is used to acquire the IP address of the cable card is an interface of the host, and information for identifying the interface of the host is included in a message including the eth header.

The IP header and the UDP header indicate encapsulation of a message using a communication protocol used for transmission/reception of the message. The header may vary according to the used communication protocol.

The DHCP message is a payload including actual data. If the message is a message transmitted from the host to the IP address allocation server, the message includes the identification information of the cable card. If the message is a message transmitted from the IP address allocation server to the host, the message may include network information for the cable card allocated to the cable card.

Figure 6:
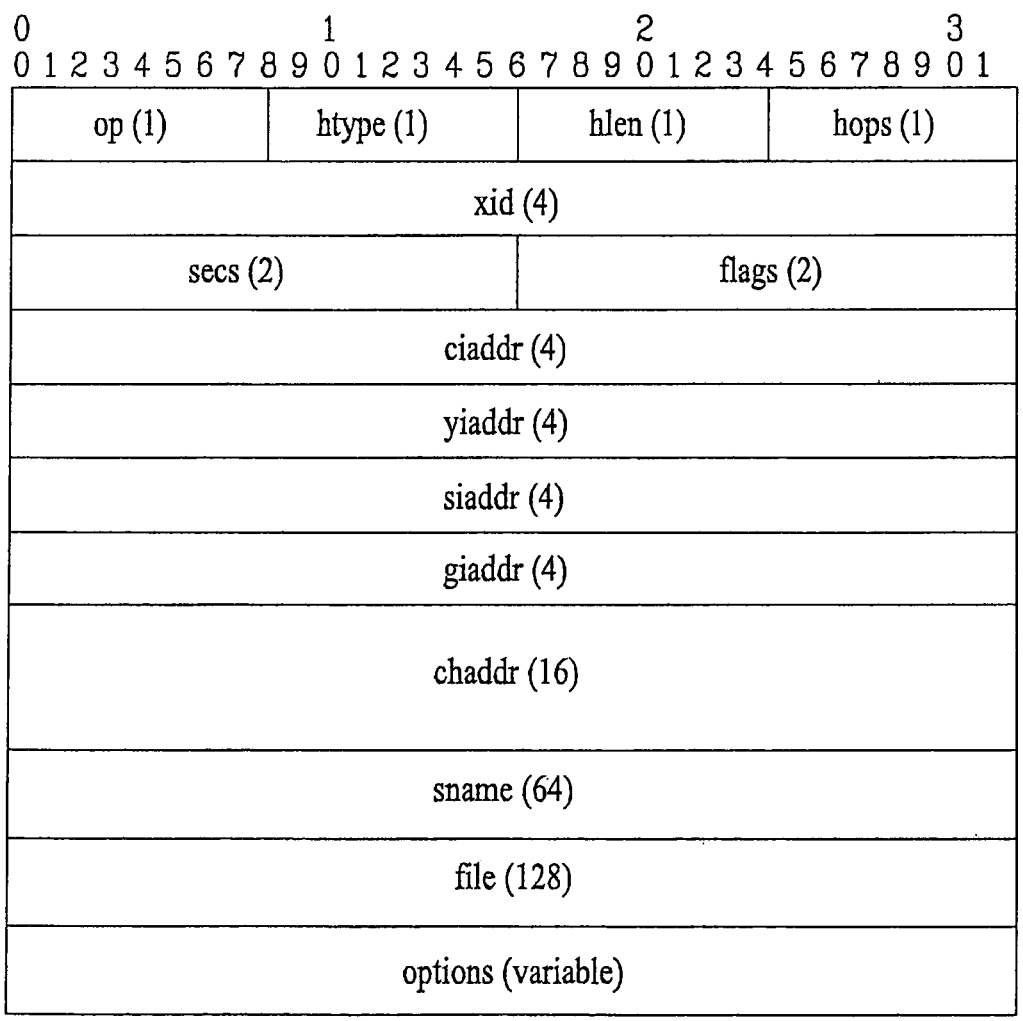
FIG. 6 is a characteristic view of a format of transmitted/received message shown in FIG. 5.

FIG. 6 shows a format of transmitted/received message shown in FIG. 5 in detail.

Referring to FIG. 6, a position where data is inserted into the payload can be confirmed.

A chaddr field to which a hardware address is added may include the identification number of the cable card and the option data of the cable card may be included in an option field. The IP address which is allocated to the cable card by the IP address allocation server is included in a yiaddr field.

Figure 7:
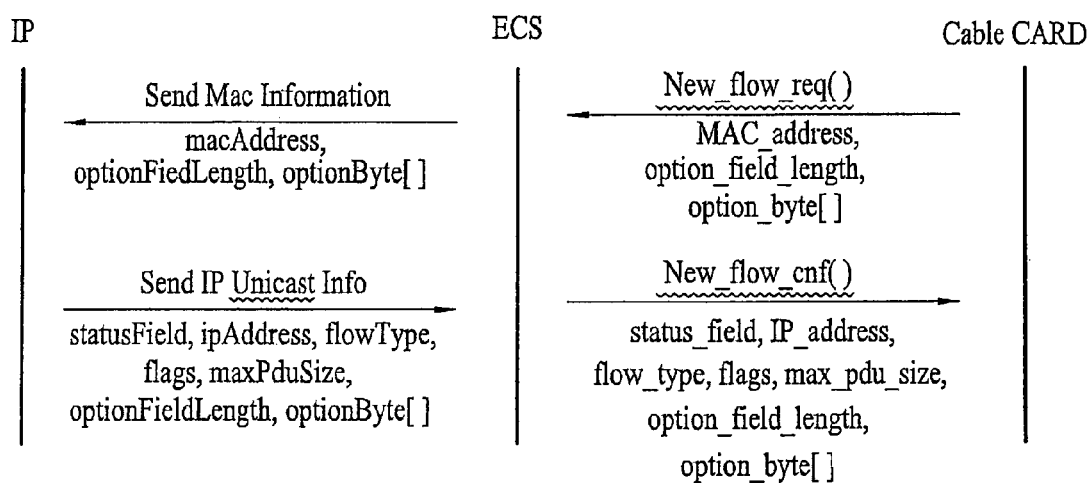
FIG. 7 is a view illustrating a process of allocating IP addresses to internal processes in the host.

FIG. 7 is a view illustrating an example of an overall process of allocating IP addresses to internal processes in the host.

Referring to FIG. 7, in the host, messages are exchanged between the IP process (denoted by IP) and the host process (denoted by ECS).

The host process receives the MAC address and the option data of the cable card from the cable card via the CCIF. The host process receives a message including the MAC address and the option data from the cable card and sends the received message to the IP address allocation server via the DHCP client which is the IP process. In this case, the message, in which the MAC address and the option data of the cable card are included by the IP process, is sent to the IP address allocation server via the physical interface of the host. At this time, the physical interface identifier of the host, the MAC address and the option information of the cable card are included in the message.

The IP process receives the IP address for the cable card from the IP address allocation server and sends the received IP address for the cable card to the host process.

The host process sends the received IP address for the cable card to the cable card via the CCIF.

Figure 8:
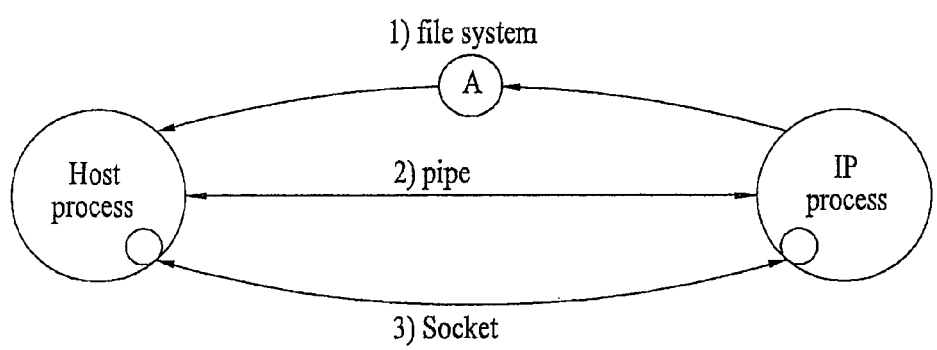
FIG. 8 is a view showing internal process communication between a host process and an IP process in the host.

Hereinafter, the communication between the host process and the IP process will be described in detail. FIG. 8 is a view showing internal process communication between the host process and the IP process in the host.

Referring to FIG. 8, examples of the communication between the internal processes may include a file system, a pipe and a unix socket.

As shown in FIG. 7, in the host, the host process and the IP process can be operated together and the cable card acquires the IP address via the two processes. At this time, the internal process communication between the host process and the IP process is required. The communication between the internal processes is necessary when a message or an event is exchanged between individual processes with respect to information which is internally implemented.

The file system indicates that a file generated in a process is formed at the outside of the process and is sent to another process. The pipe indicates that two processes are connected to each other such that an output of one process can be used as an input of the other process. The unix socket directly connects the host process to the IP address.

In the embodiment of the present invention, the host process may use all the file system, the pipe and the unix socket. In order to include the option information in the DHCP message generated by the IP process, the file system is used. Both a command and other message may be communicated using the unix socket. Both the option information and other message may be communicated using the unix socket.

Hereinafter, the effective operation of the IP process using the internal processes communication will be described.

The IP process may be stopped or re-operated according to an operation mode of the cable card.

The operation mode of the cable card largely includes three modes, that is, an out-of-band (OOB) mode, a DOCSIS set-top box gateway (DSG) 2-way mode and a DSG 1-way mode. In the OOB mode, since the cable card functions as a link modem such that the IP address is transmitted from the host to the cable card, the IP process of the host may not be operated. Even in the DSG 1-way mode, since the two-way communication is interrupted, the IP communication is impossible. Accordingly, even in this state, the IP process of the host may not be operated. If the operation mode of the cable card is switched from the OOB mode or the DSG 1-way mode to the DSG 2-way mode, the IP process is newly operated or the interrupted IP process of the host is re-operated.

That is, in the OOB mode or the 1-way mode, since the IP process is not operated, the IP process which is being operated is killed. If the operation mode is switched to the 2-way mode, the IP process is re-operated.

If the host executes a host control program, a great amount of threads including a new process or a process which is a portion of the program are generated. If the new process is generated during the operation of the host process, a system load may be increased. For example, since the host process such as the Linux process is bulky and all the threads which have been executed are copied to the new process, the resource of the system is wasted.

If the IP process is killed in order to stop the operation of the process, the process may not be clearly erased and Zombie processes may be generated. If the IP process continuously perform operations fork() and kill() on an embedded system, the stability of the system may deteriorate.

Accordingly, in the embodiment, the IP process of the host, which was run once, is controlled such that the effect obtained when the IP process is killed, is obtained even in a state in which the IP process is not killed, even in a case that the mode is switched until the system is completed. The IP process is controlled to three states including a "RUNNING" state, a "SUSPEND" state and a "RESUME" state via the unix socket communication.

The "SUSPEND" state indicates a state in which the IP process is continuously operated but no action is internally taken in a waiting state until the operation of the IP process is normally performed or a "RESUME" command is received according to the mode.

The host adequately controls the IP process according to the operation mode of the cable card. For example, when the mode is switched to the OOB mode or the DSG 1-way mode, the host sends a "SUSPEND" command to the IP processes for the host and the cable card via the internal process communication such that the operation of the IP process is immediately stopped. When the cable modem sends a "2-way OK" message, the host sends the "RESUME", command to the IP process for the host in order to acquire the IP address of the host. At this time, the IP process is controlled to be resumed in an INIT-REBOOT state.

Similarly, when the cable card makes a request for the IP address, the host sends a "RESUME" command to the IP process for the cable card. At this time, the IP process for the cable card is also resumed in the INIT-REBOOT state.

After the "RESUME" command is received, the state of the IP process is switched to the "RUNNING" state. A case where the IP process is not operated or a case where the IP process is operated once while the switching is performed between the "SUSPEND" state and the "RUNNING" state are distinguished from each other. Otherwise, many IP processes may be generated on the system.

In order to determine whether or not the IP process is operated, it may be determined whether a Pid file is generated while the IP process is performed or it may be determined whether or not the unix socket communication is normally operated.

The Pid file for the IP processes and files which are generated while performing the IP process may be stored in a memory, may be automatically deleted when power is turned off, or may be deleted at the time of the completion of the system in a case of being stored in a flash memory.

While the host process and the IP process are operated via the internal communication, the IP address for the host and the IP process for the cable card are acquired. The IP process may send the IP address to the host process via the internal communication when receiving the IP address for the cable card from the IP address allocation server, and the host process may transmit the IP address for the cable card to the cable card via the CCIF. The host process may stop or operate the IP process so as to stabilize the system.

In vendor specific information which is the vendor information of the cable card, if a file for the option information is separately generated by the host and a DHCP message is generated by the DHCP client, the DHCP client may read this file and include option information related thereto in the option field of the DHCP message. Alternatively, if the DHCP client generates the DHCP message, the DHCP client may make a request for the option information related thereto to the host process via the unix socket interface and include the option information in the option field of the DHCP message.

FIG. 9 is a view showing the configuration of the broadcasting receiver. Referring to FIG. 9, first, a host 900 receives a stream broadcasting signal from the headend and transmits the stream broadcasting signal to a security module 950. Hereinafter, the cable card is used as an example of the security module. The broadcasting signal which is restrictively received by the cable card 950 is transmitted to the host 900 again to allow a viewer to view the broadcasting.

The broadcasting receiver includes the host 900, a cable communication unit 940 and the cable card 950. At this time, the host operates the process for acquiring the IP address of the cable card.

A method of acquiring the IP address of the cable card will be described with reference to FIG. 9. The digital broadcasting receiver includes the host 900, the cable communication unit 940 and the cable card 950. The host 900 includes a tuner 902, a demultiplexer 904, an audio decoder 906, a video decoder 908, an output unit 910, an additional information processor 912, a conditional access module (CAS) module 914, a key input unit 919, a card interface unit 918, a memory 920, and a controller 930.

The tuner 902 seeks a broadcasting channel selected by a user. If the user changes a viewing channel, a frequency corresponding thereto is selected. A signal according to the selected frequency is input to a demodulator (not shown) which demodulates the signal in a vestigal side band (VSB) or quadrature amplitude modulation (QAM) scheme, and the demodulated signal is converted into a digital signal by an A/D converter (not shown).

The demultiplexer 904 demultiplexes a time-multiplexed transport stream into video, audio and additional information signals.

The audio decoder 906 decodes the audio signal output from the demultiplexer 904 and outputs the decoded signal to the output unit 910. The video decoder 908 decodes the video signal outputted from the demultiplexer 904 and the output unit 910 displays the video signal.

The CAS module 914 extracts entitlement control message (ECM) packet indicator (PID) and a local transport stream ID (LTSID) from the information analyzed by the additional information processor 912.

A desired command of the user is input to the key input unit 919 and the control unit 930 controls the whole operations of the components of the digital broadcasting receiver.

The controller 930 performs a restrictive reception function between the cable card 950 and the host 900 and a duplication restriction process. The controller 930 divides the received digital broadcasting signal into a main stream and an extra stream, determines whether or not the streams are scrambled, and descrambles a scrambled stream.

The controller 930 operates the host process and the IP process and controls the acquisition of the IP address of the cable card. The host process and the IP process may be performed by the controller 930.

The memory 920 stores and extracts necessary information according to a control signal of the controller 930. In the present embodiment, information on the stream which is subjected to the determination as to whether or not the stream is scrambled is stored by the control signal of the controller 930.

The cable card 950 is inserted into the card interface unit 918. The card interface unit 918 may be positioned in any one or both of the host and the security module 950. The card interface unit 918 functions as a data communication path when the controller 930 reads the identification information and the option information of the cable card from the cable card, and the host functions as a data communication path for transmitting the IP address for the cable card received from the IP address allocation server to the cable card.

The cable communication unit 940 performs the network communication. In the present invention, the cable communication unit 940 is connected to the IP address allocation server so as to transmit/receive a message to/from the IP address allocation server. Examples of the cable communication unit include a cable modem.

In the present embodiment, a descrambling module is included in the cable card and the cable card may be attached/detached to/from the host. The broadcasting signal from a broadcasting station is descrambled by the descrambling module of the cable card and is provided to the user. Alternatively, the descrambling module may be included in the host without the cable card and the descrambling module may be included in the host when the descrambling module is downloaded from the broadcasting station. In this case, the descrambling module which is downloaded from the broadcasting station is stored in a predetermined memory of the host.

A method of downloading the descrambling module may be, for example, performed by automatically downloading a conditional access (CA) image from the headend when a security processor which is previously mounted in a set top box is connected to a network.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of communicating between an Internet protocol (IP) address allocation server and a cable card for a host device, the method comprising:

performing, by the host, an IP process for acquiring identification information of the cable card and transmitting a message including the identification information of the cable card to the IP address allocation server;

receiving by the host, an IP address for the cable card from the IP address allocation server; and sending by the host the received IP address for the cable card to the cable card: wherein the IP process is suspended when a communication mode between the host and the cable card is an out-of-band (OOB) mode or a DOCSIS set-top box gateway (DSG) one-way mode, and the IP process is resumed when the communication mode between the host and the cable card is a DSG two-way mode.

2. The method according to claim 1, wherein the identification information of the cable card is an identification number of the cable card.

3. The method according to claim 2, wherein the identification number of the cable card is any one of a media access control (MAC) address of the cable card and a serial number of the cable card.

4. The method according to claim 1, wherein the message includes information on a manufacturer of the cable card.

5. The method according to claim 1, wherein, in the transmitting of the message to the IP address allocation server, the message is transmitted in a form of a dynamic host configuration protocol (DHCP).

6. The method according to claim 1, wherein the host operates at least one of a host process for controlling an internal system of the host and an IP process for acquiring the IP address from the IP address allocation server.

7. The method according to claim 6, wherein the IP process is controlled to a "RUNNING" state, a "SUSPEND" state and a "RESUME" state via socket communication.

8. The method according to claim 6, wherein the host process and the IP process communicate with each other using any one of a file system, a pipe and a socket.

9. The method according to claim 1, further comprising, performing, by the cable card, communication using the IP address for the cable card.

10. A broadcasting receiver communicating with an IP address allocation server, the broadcasting receiver comprising:

a cable card configured to send a request for an IP address of the cable card; and a host configured to perform an IP process for acquiring the IP address from the IP address allocation server, the host comprising:

a controller configured to receive the request from the cable card, transmit a message including identification information of the cable card to the IP address allocation server, receive the IP address of the cable card from the IP address allocation server, and transmit the received IP address to the cable card, wherein the IP process is suspended when a communication mode between the host and the cable card is an out-of-band (OOB) mode or a DOCSIS set-top box gateway (DSG) one-way mode, and the IP process is resumed when the communicatoin mode between the host and the cable card is a DSG two-way mode.

11. The broadcasting receiver according to claim 10, further comprising:

a card interface configured to perform communication between the cable card and the controller; and a cable communication unit configured to perform communication between the controller and the IP address allocation server.

12. The broadcasting receiver according to claim 10, wherein the identification information of the cable card is an identification number of the cable card.

13. The broadcasting receiver according to claim 12, wherein the identification number of the cable card is any one of a media access control (MAC) address of the cable card and a serial number of the cable card.

14. The broadcasting receiver according to claim 10, wherein the message includes information on a manufacturer of the cable card.

15. The broadcasting receiver according to claim 10, wherein the message is transmitted by the host in the form of a dynamic host configuration protocol (DHCP).

16. The broadcasting receiver according to claim 10, wherein the host operates at least one of a host process for controlling an internal system of the host and an IP process for acquiring the IP address from the IP address allocation server.

17. The broadcasting receiver according to claim 16, wherein the IP process is controlled to a "RUNNING" state, a "SUSPEND" state and a "RESUME" state via socket communication.

18. The broadcasting receiver according to claim 16, wherein the host process and the IP process communicate with each other using any one of a file system, a pipe and a socket.

19. The broadcasting receiver according to claim 10, wherein the cable card performs communication using the received IP address.

\* \* \* \* \*